United States Patent
Kurumada et al.

(10) Patent No.: US 7,006,722 B2
(45) Date of Patent: Feb. 28, 2006

(54) WAVEGUIDE TYPE OPTICAL DEVICE AND POSITION DETECTING METHOD

(75) Inventors: Katsuhiko Kurumada, Tokyo (JP); Toshiaki Tamamura, Tokyo (JP); Masatoshi Kanaya, Tokyo (JP); Shigendo Nishi, Tokyo (JP); Keiichi Akagawa, Kamakura (JP)

(73) Assignees: NTT Electronics Corporation, Tokyo (JP); Nikon Corporation, Tokyo (JP)

( * ) Notice: Subject to any disclaimer, the term of this patent is extended or adjusted under 35 U.S.C. 154(b) by 0 days.

(21) Appl. No.: 10/509,012

(22) PCT Filed: Mar. 28, 2003

(86) PCT No.: PCT/JP03/03965

§ 371 (c)(1),
(2), (4) Date: Sep. 27, 2004

(87) PCT Pub. No.: WO03/083551

PCT Pub. Date: Sep. 10, 2003

(65) Prior Publication Data

US 2005/0163421 A1   Jul. 28, 2005

(30) Foreign Application Priority Data

Mar. 28, 2002   (JP) .............................. 2002-091406

(51) Int. Cl.
*G02B 6/26* (2006.01)

(52) U.S. Cl. .............................. 385/18; 385/16; 385/39

(58) Field of Classification Search .................. 385/16, 385/18, 19, 39
See application file for complete search history.

(56) References Cited

U.S. PATENT DOCUMENTS

| | | | | | |
|---|---|---|---|---|---|
| 5,016,978 | A | * | 5/1991 | Fargette et al. | 359/234 |
| 5,140,149 | A | * | 8/1992 | Sakata et al. | 257/436 |
| 6,360,036 | B1 | * | 3/2002 | Couillard | 385/19 |
| 6,493,482 | B1 | * | 12/2002 | Al-hemyari et al. | 385/19 |
| 6,628,452 | B1 | * | 9/2003 | Haeberle et al. | 359/298 |
| 6,633,212 | B1 | * | 10/2003 | Ruan et al. | 335/78 |
| 2001/0017957 | A1 | * | 8/2001 | Horino et al. | 385/16 |

FOREIGN PATENT DOCUMENTS

JP          2001-296484       10/2001

OTHER PUBLICATIONS

M, Katayama et al. "Micromachined 2×2 Optical Switch Array by Stress-Induced Bending," Technical Digest of Fourth International Topical Meeting on Contemporary Photonic Technologies (CTP 2001), p. 27-28, Mc-4, Jan. 15-17, 2001.

* cited by examiner

*Primary Examiner*—Ellen E. Kim
(74) *Attorney, Agent, or Firm*—Venable, LLP; Michael A. Sartori (57) ABSTRACT

A waveguide type optical device performs such monitoring as detection of a relative position of an insert plate to a groove. The waveguide type optical device comprises a groove disposed at an intersection position of a first optical waveguide and a second optical waveguide; an insert plate disposed to be insertable into the groove; means for applying a static magnetic field such that a vector product of a velocity vector (A) of the insert plate and its magnetic field vector (B) is nonzero; a cantilever that has electrical wiring including therein a wiring part lying in a direction perpendicular to both the velocity vector and the magnetic field vector and that supports the insert plate; and means for detecting a relative position of the insert plate to the groove by detecting a current induced in the electrical wiring.

7 Claims, 11 Drawing Sheets

WAVEGUIDE TYPE OPTICAL DEVICE AND POSITION DETECTING METHOD

TECHNICAL FIELD

This invention relates to a waveguide type optical device and a method for detecting a position, and more specifically to a waveguide type optical device having an insert plate that is disposed to be insertable into a groove used for controlling optical paths of optical waveguides arranged on a substrate, and a position detecting method for detecting a relative position of the insert plate to the groove.

BACKGROUND ART

In optical transmission systems, optical switches for changing optical paths to achieve switching of an optical signal are being used in recent years. Especially, the matrix type optical switch for changing optical paths between a plurality of inputs and a plurality of outputs is highly demanded. As a typical matrix type optical switch, there is known an optical switch that switches optical paths by putting a micro mirror constructed by the MEMS (Micro Electro Mechanical Systems) technique into and out of a groove provided between optical paths.

Figure 1A:
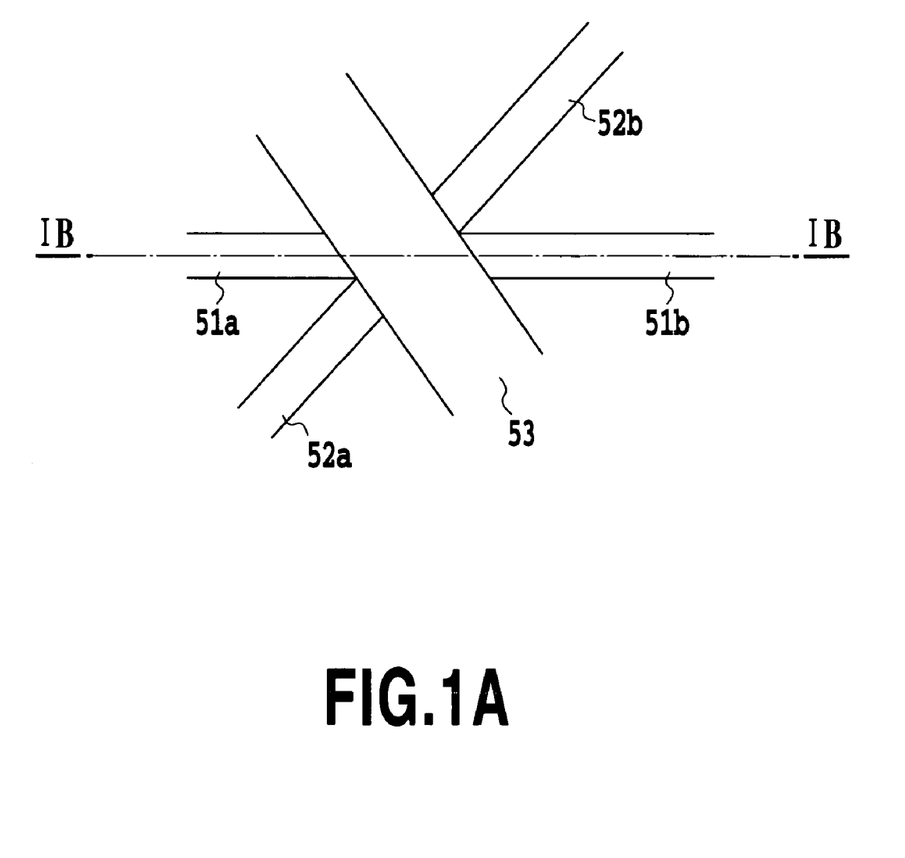
FIG. 1A is a plan view showing a configuration of the conventional matrix type optical switch in which the groove part is enlarged.
Figure 1B:
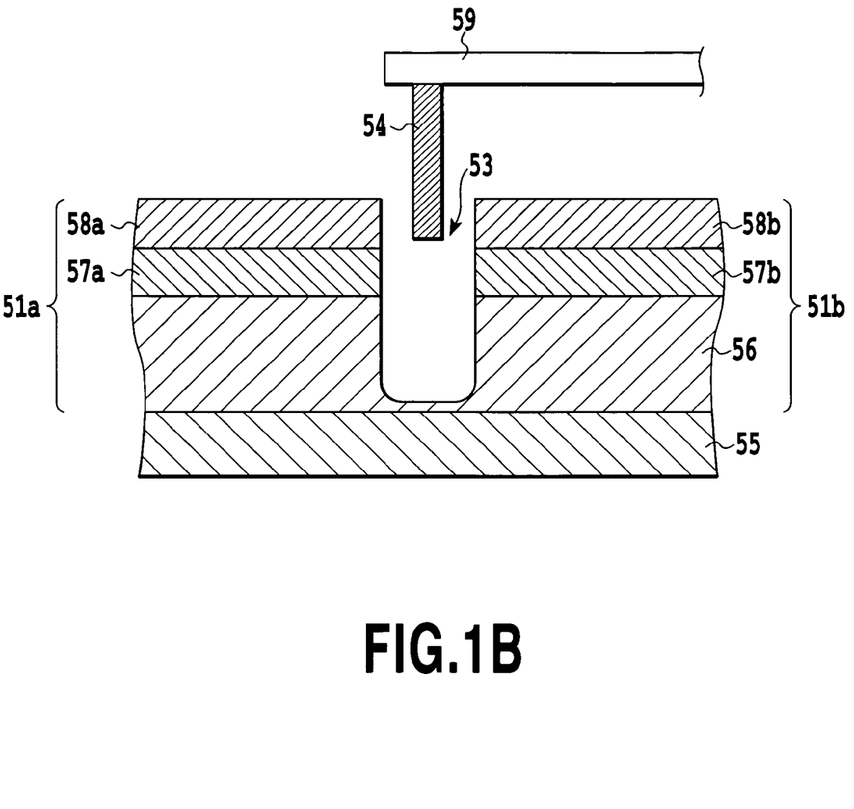
FIG. 1B is a sectional view of the switch taken along line IB—IB of FIG. 1A.

FIGS. 1A and 1B show a configuration of the conventional matrix type optical switch. The matrix type optical switch is such that mutually parallel m-optical waveguides (m: the number of inputs) and mutually parallel n-optical waveguides (n: the number of outputs) are crossed, grooves are formed at intersection positions, respectively, and a core of each pair of intersecting optical waveguides is cut away. FIG. 1A is a top view showing the enlarged groove and neighborhood. A groove 53 is provided at an intersection of two optical waveguides 51, 52 each composed of the core layer and the cladding layers.

FIG. 1B is a sectional view taken along line 1B—1B of FIG. 1A. A lower cladding layer 56 and a core layer 57 that will constitute the optical waveguide are deposited successively on a substrate 55, and the optical waveguides 51, 52 are formed by a photolithographic method. The lower cladding layer 56 and the core layer 57 are covered with an upper cladding layer 58 to complete the optical waveguides. The groove 53 is provided by removing the upper cladding layer 58, the core layer 57 and a part of the lower cladding layer 56.

Above the groove 53, a cantilever 59 on whose point an insert plate 54 is mounted is installed. The cantilever 59 with the insert plate 54 is configured so that the insert plate 54 is movable in a depth direction of the groove 53, i.e., in a direction perpendicular to the optical waveguides. When the insert plate 54 does not block the core layer 57, the optical waveguides 51, 52 will be in a transmission state; when the insert plate 54 blocks the core layer 57, the optical waveguides 51, 52 will be in an interception state. In the interception state, since the insert plate 54 has a reflecting surface 4, light inputted from the optical waveguide 51a can be coupled to the optical waveguide 52a, and light inputted from the optical waveguides 51b can be coupled to the optical waveguide 52b. Thus, an m×n matrix type optical switch can be constructed.

A relative position of the insert plate 54 to the groove 53 is controlled by driving the cantilever 59. As one of typical driving principles, the control is performed by temperature control with a bimetal. For example, electrical wiring serving as a resistive heat generating source is provided on the cantilever 59, its temperature is controlled by changing an impressed current therein, and a position of the insert plate 54 is adjusted by means of balance between a driving force by the bimetal and a repulsion force of a spring fixed to the cantilever 19. Moreover, a method whereby a free point part of a cantilever is drawn up to a fixed substrate side with an attractive force of static electricity is described in M. Katayama et al. "Micromachined 2×2 Optical Switch Array by Stress-Induced Bending," Technical Digest of Fourth International Topical Meeting on Contemporary Photonic Technologies (CTP 2001), p. 27–28, Mc-4, Jan. 15–17, 2001.

In the conventional driving principle, an impressed current for heating the bimetal and an applied voltage that defines the amount of static electricity given against the repulsion force are controlled in order to control the repulsion force of the spring of the cantilever. This principle has, however, a problem that this scheme cannot detect a relative position of the insert plate to the groove and acquire information necessary to determine a static position.

Therefore, there is also a problem that the principle cannot detect secular change of the relative position of the insert plate to the groove that is caused by variation in a mechanical characteristic of the cantilever as a bimetal, deformation of a supporting joint part between the insert plate and the cantilever, etc., and therefore malfunction of the insert plate caused by breakage of the cantilever etc. also cannot be detected.

DISCLOSURE OF THE INVENTION

This invention was invented in view of such problems, and the object thereof is to provide a waveguide type optical device capable of performing such monitoring as detection of a relative position of the insert plate to the groove, detection of movement abnormality of the insert plate, and detection of a failure in the static position, and a method for detecting a position of the insert plate.

In order to achieve this object, a waveguide type optical device comprises a first optical waveguide disposed on a substrate, a second optical waveguide intersecting the first optical waveguide, and a groove that is disposed at an intersection position of the first optical waveguide and the second optical waveguide and is for controlling optical paths of the optical waveguides. The waveguide type optical device further comprises an insert plate disposed in the groove so as to be insertable into a groove; means for applying a static magnetic field such that a vector product of a velocity vector of the insert plate and its magnetic field vector is nonzero; a cantilever that has electrical wiring including therein a wiring part lying in a direction perpendicular to both the velocity vector and the magnetic field vector and that supports the insert plate; and means for detecting a relative position of the insert plate to the groove by detecting a current induced in the electrical wiring.

Therefore, the waveguide type optical device can perform such monitoring as detection of relative position of the insert plate to the groove, detection of movement abnormality of the insert plate, and detection of failure in the static position.

The groove may be filled with a liquid having the refractive index being matched to the refractive index of the optical waveguides.

The insert plate has a reflecting surface, and thereby can select either of two optical paths depending on its relative position to the groove: one from an input port of the first optical waveguide to an output port of the first optical waveguide; and one for the input port of the first optical waveguide to an output port of the second optical waveguide.

The electrical wiring is supplied with an impressed current that gives the Lorentz' force driving the cantilever in order to insert the insert plate into the groove.

Moreover, this invention is a position detecting method for detecting a relative position of the insert plate disposed to be insertable into a groove used for controlling the optical paths of the optical waveguides arranged on a substrate with respect to the groove, in which the static magnetic field such that a vector product of the velocity vector of the insert plate and its magnetic field vector is nonzero is applied to the groove, a pulsed driving force is applied to a cantilever for a predetermined time that has electrical wiring including therein the wiring part lying in a direction perpendicular to both the velocity vector and the magnetic field vector and that supports the insert plate, a current induced in the electrical wiring is detected, and thereby a relative position of the insert plate to the groove is detected.

BEST MODE FOR CARRYING OUT THE INVENTION

The embodiments of the present invention will be described in detail below, referring to the drawings. As an example of the waveguide type optical device, an optical switch will be described.

Figure 2:
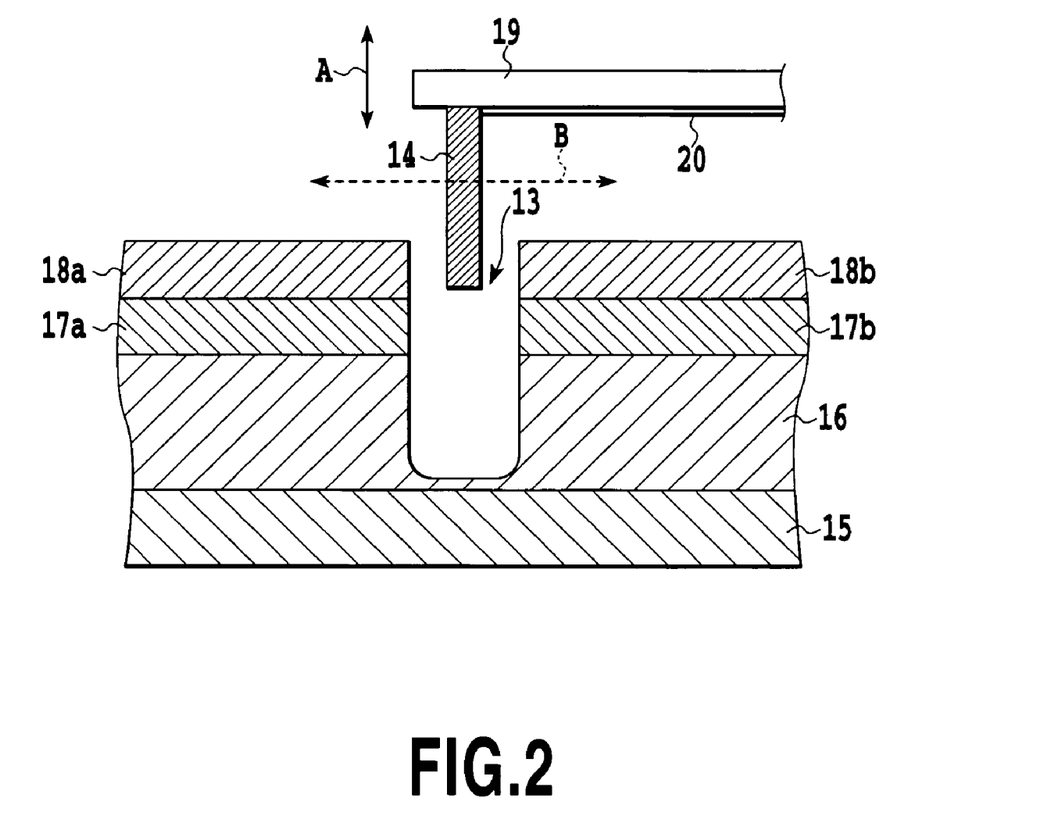
FIG. 2 is a sectional view showing a configuration of an optical switch according to one embodiment of the present invention.

FIG. 2 shows a configuration of the optical switch according to the one embodiment of the present invention. On a substrate 15, a lower cladding layer 16 and a core layer 17 that will constitute the optical waveguide are deposited successively and subjected to photolithography to form optical waveguides. The lower cladding layer 16 and the core layer 17 are covered with an upper cladding layer 18 to complete the optical waveguide. A groove 13 is provided by removing the upper cladding layer 18, the core layer 17 and a part of the lower cladding layer 16. A cantilever 19 to which an insert plate 14 is attached at the point thereof is disposed above the groove 13. The cantilever 19 with the insert plate 14 is configured so that the insert plate 14 is movable in a depth direction (indicated by the arrow A) of the groove 13, i.e., in a direction perpendicular to the optical waveguides.

The groove 13 is filled with a matching oil having the refractive index being matched to the refractive index of the optical waveguides, and the static magnetic field is applied in a direction of the arrow B in a space in which the insert plate 14 moves. As means for applying a static magnetic field (not shown in the figure), a magnet of a composition of, for example, a Nd—Fe—B system, is disposed close to the back surface of the substrate 15 or close to the upper cladding layer 18. Since the substrate 15 is a Si substrate of a thickness of 1 mm or less and the material is non-magnetic, the magnetic can form a near magnetic field in a space in which the insert plate 14 moves.

Figure 3A:
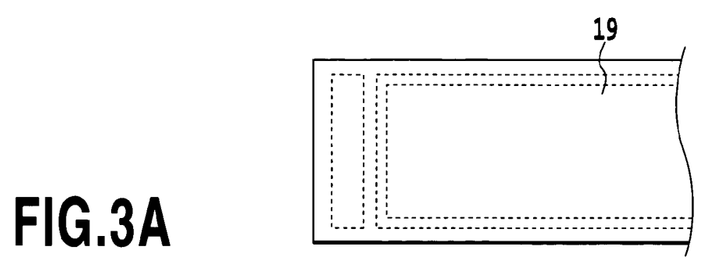
FIG. 3A is a plan view showing a driving mechanism of the insert plate according to the one embodiment of the present invention.
Figure 3B:
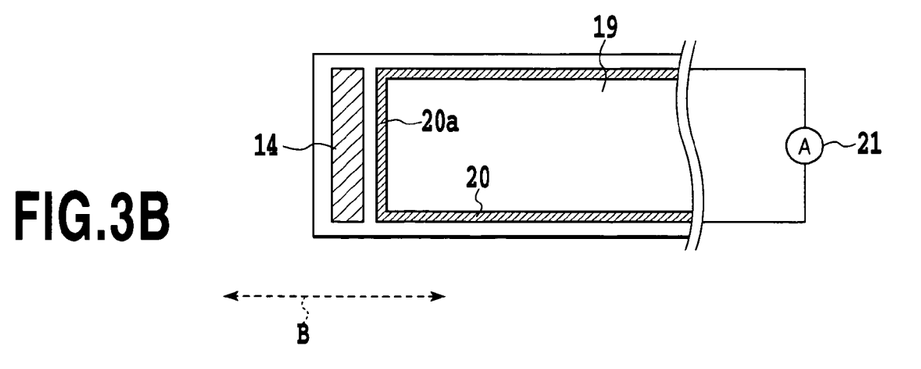
FIG. 3B is a bottom view showing the driving mechanism of the insert plate according to the one embodiment of the present invention.
Figure 4:
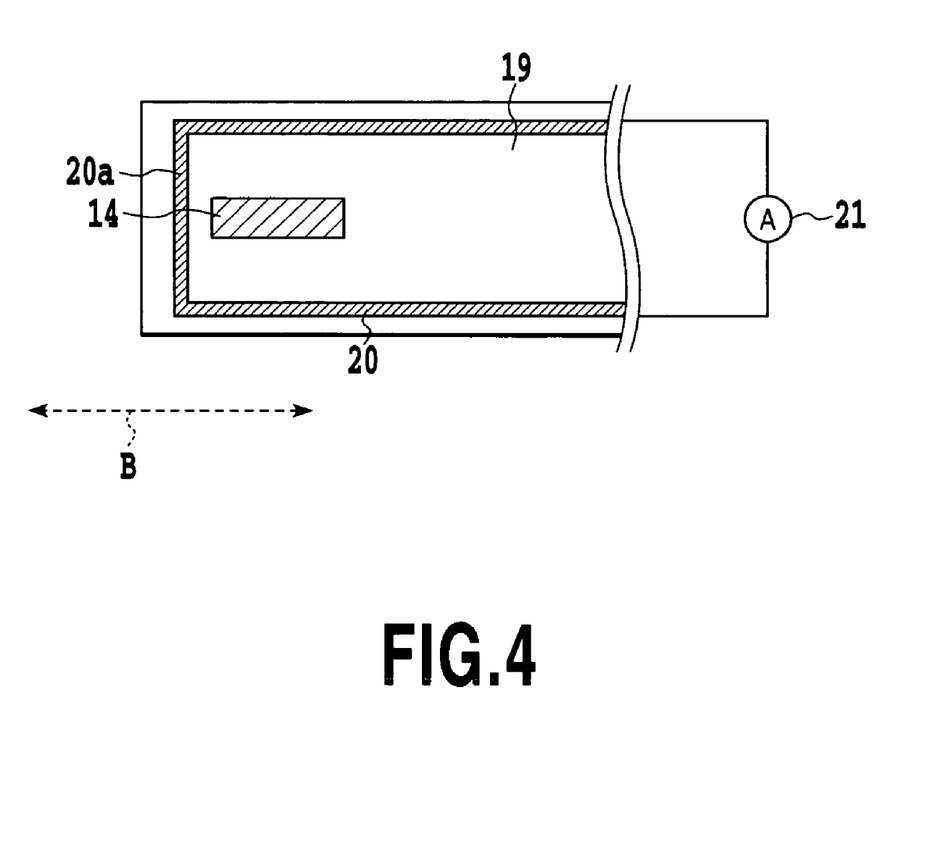
FIG. 4 is a bottom view showing a driving mechanism of the insert plate according to another embodiment.

FIGS. 3A and 3B show the driving mechanism of the insert plate according to the one embodiment of the present invention. FIG. 3A is a top view; FIG. 3B is a bottom view. The insert plate 14 is mounted on the cantilever 19. The insert plate 14 is just required to be mounted in such a way that a direction of the arrow A shown in FIG. 2 lies in its plane, and, as shown in FIG. 4, no specific relationship between a direction of a plane of the insert plate 14 and a longitudinal direction of the cantilever 19 is required. Electrical wiring 20 is installed on the undersurface of the cantilever 19, and connected to an ammeter 21 provided outside the driving mechanism.

The electrical wiring 20 has a wiring part 20a of a fixed length in a direction perpendicular to the direction B of the static magnetic field shown in FIG. 2. The magnetic field is applied to the wiring part 20a so that a vector product B×v of its magnetic field vector B and the velocity vector v of the insert plate 14 becomes nonzero. Accordingly, since the wiring part 20a is at right angles to both the velocity vector and the magnetic field vector; when the insert plate 14 moves in the direction of the arrow A shown in FIG. 2, the induced current will flow in the electrical wiring 20, and can be detected with the ammeter 21. A displacement Δx of the insert plate 14 when a fixed driving force Δf is applied to the cantilever 19 for only a fixed time Δt is correlated with a current value detected with the ammeter 21. With detecting means not shown in the figure, a relative position of the insert plate to the groove is detected as a function of a current value of the ammeter 21.

Note that although the wiring part 20a is specified as a straight line part that is set at right angles to both the velocity vector and the magnetic field vector, the wiring part 20a may be an oblique straight line or a curved line. That is, the wiring part may be of any shape as long as it includes a component perpendicular to both the velocity vector and the magnetic field vector. As a driving force of the cantilever 19, a force by a bimetal or an electrostatic force can be used. Moreover, the Lorentz' force may also be used as the driving force of the cantilever 19. In this case, it is necessary to install another electrical wiring for driving the cantilever 19 on the top surface thereof. Alternatively, the electrical wiring 20 according to the present invention may be used as the electrical wiring for driving the cantilever 11 and the electrical wiring 20 may be shared by both driving and monitoring in a time-division manner.

When one of a bimetallic force, an electrostatic force, and the Lorentz' force is applied on the cantilever 19 as a driving force, the velocity v generated in the insert plate 14 is governed by two factors. The first factor includes several driving forces by several methods for driving the cantilever, such as a repulsion force due to a spring constant of the cantilever 19, a static force generated by applying a voltage between the electrical wiring 20 and electrodes on the cantilever 19 moving together with the cantilever 19 and electrodes fixed outside the cantilever 19, and the Lorentz' force generated by a combination of a current applied to the electrical wiring 20 on the cantilever 19 and the static magnetic field, and a driving force by a combination of these forces.

The second factor is the viscous drag force that the insert plate 14 receives from the matching oil filled in the groove 13. As the viscous drag increases, the velocity v generated in the insert plate 14 becomes small and accordingly the current value detected with the ammeter 21 also becomes small. The viscous drag becomes the maximum in a state where the insert plate 14 is staying in the groove 13.

Here, consider a case where the insert plate 14 moves at a constant velocity by the viscous drag. Pertinent parameters are defined as follows: A gap between the surface of the insert plate 14 and a waveguide end face of the groove 13 is represented by G; the viscosity coefficient of the matching oil by $\mu$; the velocity of the insert plate 14 when a driving force is applied thereon for only a fixed time $\Delta t$ by v; the displacement of the insert plate by $\Delta y$; the viscous damping coefficient by C; and the area of the insert plate 14 by A. At this time, using the viscous drag force F that the insert plate 14 receives during a period of time in which it is moved by the driving force, $\Delta f$ is expressed by the following formula:

$$\Delta f = F = C \cdot v = C \cdot \Delta y / \Delta t, \quad (1)$$

where $C = 2 \, \mu A/G$.

As the thickness of the matching oil layer that the insert plate 14 borders becomes thin, that is, the gap G becomes small, the viscous drag force F becomes larger. The relative position of the insert plate 14 to the groove 13 also affects the viscous drag force F. When the insert plate 14 is in a transmission state in which the insert plate is completely off the groove 13, the gap becomes large and the viscous drag component generated in the parallel plate becomes negligible small. In this case, that component becomes a component depending on the shapes of the insert plate 14 and the cantilever 19. This component takes a value based on the viscous drag (Stokes law) to a sphere, becoming a smaller value than that when the insert plate 14 is staying within the groove 13.

Since, when a fixed driving force $\Delta f$ is applied to the cantilever 19 for only a fixed time, the left side of the formula (1) is constant; it is understood that the smaller the gap G, the smaller the velocity of the insert plate 14, that is, the smaller the displacement $\Delta x$. When the insert plate 14 and the cantilever 19 move, the wiring part 20a cuts across the static magnetic field, and consequently the induced current proportional to the velocity v of the insert plate 14 flows in the electrical wiring 20 by Fleming's rule. Therefore, the induced current detected with the ammeter 21 becomes a value that is correlated with the magnitude of the gap G.

Based on the above-mentioned principle, a pulsed driving force is applied to the cantilever 19 for only a short time and the induced current in this occasion is detected, whereby the relative position of the insert plate 14 to the groove 13 can be detected.

Figure 5:
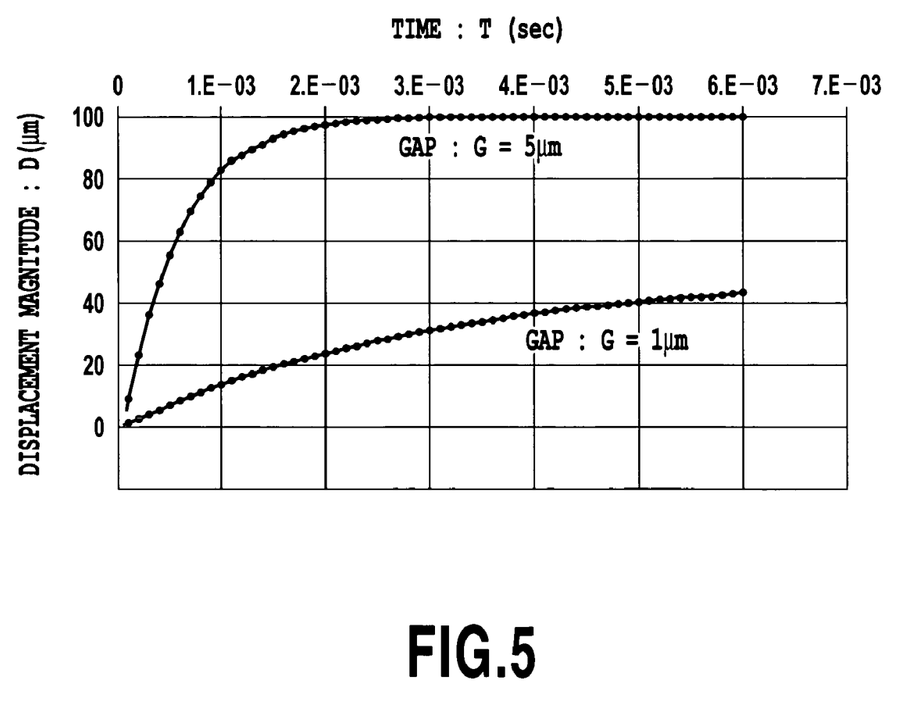
FIG. 5 is a view showing a simulation result of the driving mechanism according to the one embodiment of the present invention.

FIG. 5 shows simulation results of the driving mechanism according to the one embodiment of the present invention. The horizontal axis represents an elapsed time from a moment of releasing the elastic force of the spring of the cantilever 19; the vertical axis represents a travel distance of the insert plate 14. The cantilever 19 is of a layer configuration of SiNx/Al, and the layers have thicknesses of 0.25 $\mu$m/0.25 $\mu$m, respectively, a width of 100 $\mu$m, and a length of 600 $\mu$m. The coefficient of kinematic viscosity of the matching oil is 1 cmStokes.

FIG. 5 shows movement processes for two different gaps G when the free end of the cantilever 19 is pulled up by a distance of 100 $\mu$m and allowed to return to the initial position by spring elasticity. In the initial process of a time range of 0–1 millisecond, it can be seen that the movement velocity for a 5-$\mu$m gap is different from that for a 1-$\mu$m gap by a factor of 5 or more. In another words, it is known that the induced currents detected with the ammeter 21 are different from each other by a factor of 5 or more.

Figure 6:
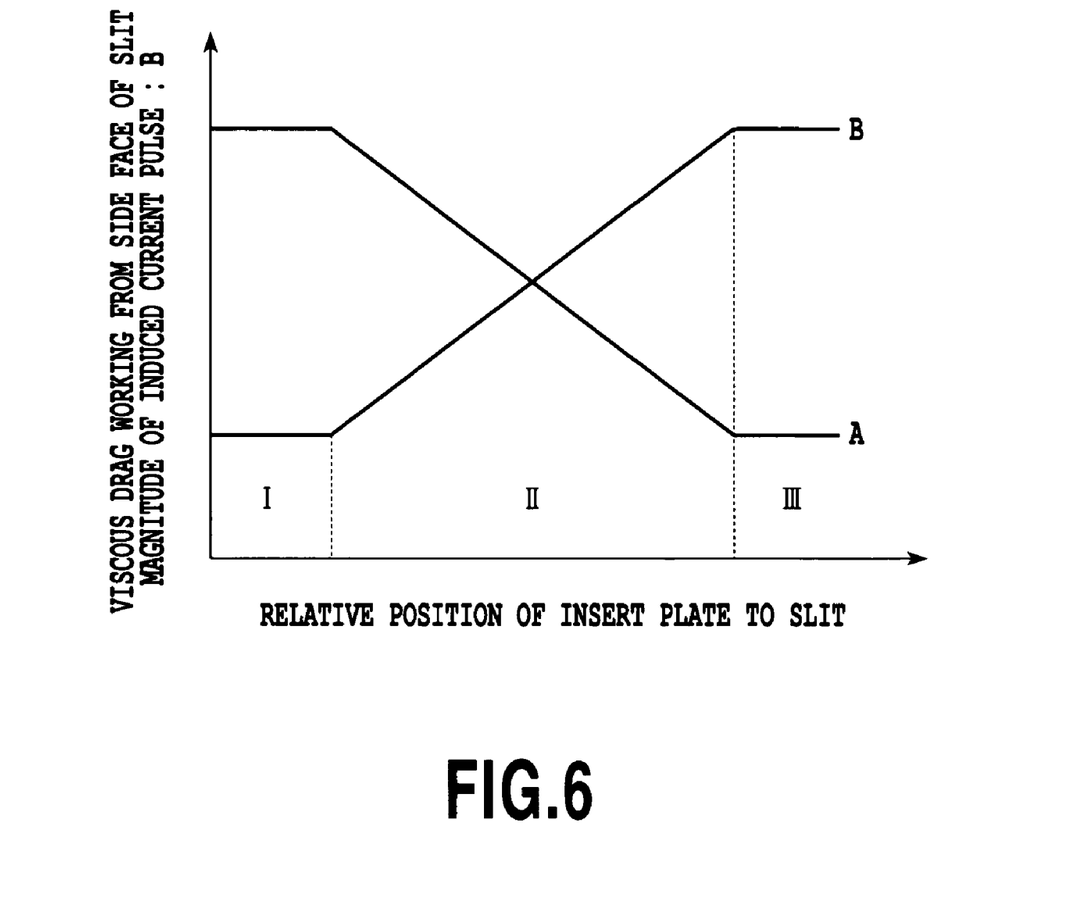
FIG. 6 is a diagram showing the viscous drag force and an induced current as a function of a relative position of the insert plate to the groove.

FIG. 6 is a diagram showing the viscous drag force and the induced current as a function of the relative position of the insert plate to the groove. According to the formula (1), the viscous drag when the insert plate 14 is being affected by inner walls of the groove 13 is divided into three areas according to a positional relation between the insert plate 14 and the groove 13. Area I is a state in which the insert plate 14 is completely embedded within the groove 13, and the viscous drag that the insert plate 14 receives is constant. Area II is a state in which the upper part of the insert plate 14 is out of the groove 13, and the viscous drag is in inverse proportion to the relative position of the insert plate 14 to the groove 13. Area III is a state in which the insert plate 14 is away from the groove 13, and the viscous drag is constant.

When a pulsed driving force is applied to the cantilever 19 for a very short time, a difference in moving velocity generated in the insert plate 14 is detected as a difference in the induced current. Such a pulsed driving force must be weak enough not to give a disturbance to the working condition of the insert plate 14 by shortening the application time. Therefore, it is necessary to increase the sensitivity of the ammeter 21 and to decrease the impedance including the electrical wiring 20. In this way, monitoring can be performed without giving a disturbance to the working condition of the insert plate 14.

In the waveguide type optical device, it is possible to optimize the shape of a magnet for applying the static magnetic field and to realize efficient arrangement of optical waveguides and reduction of the area of an optical waveguide chip.

Figure 7:
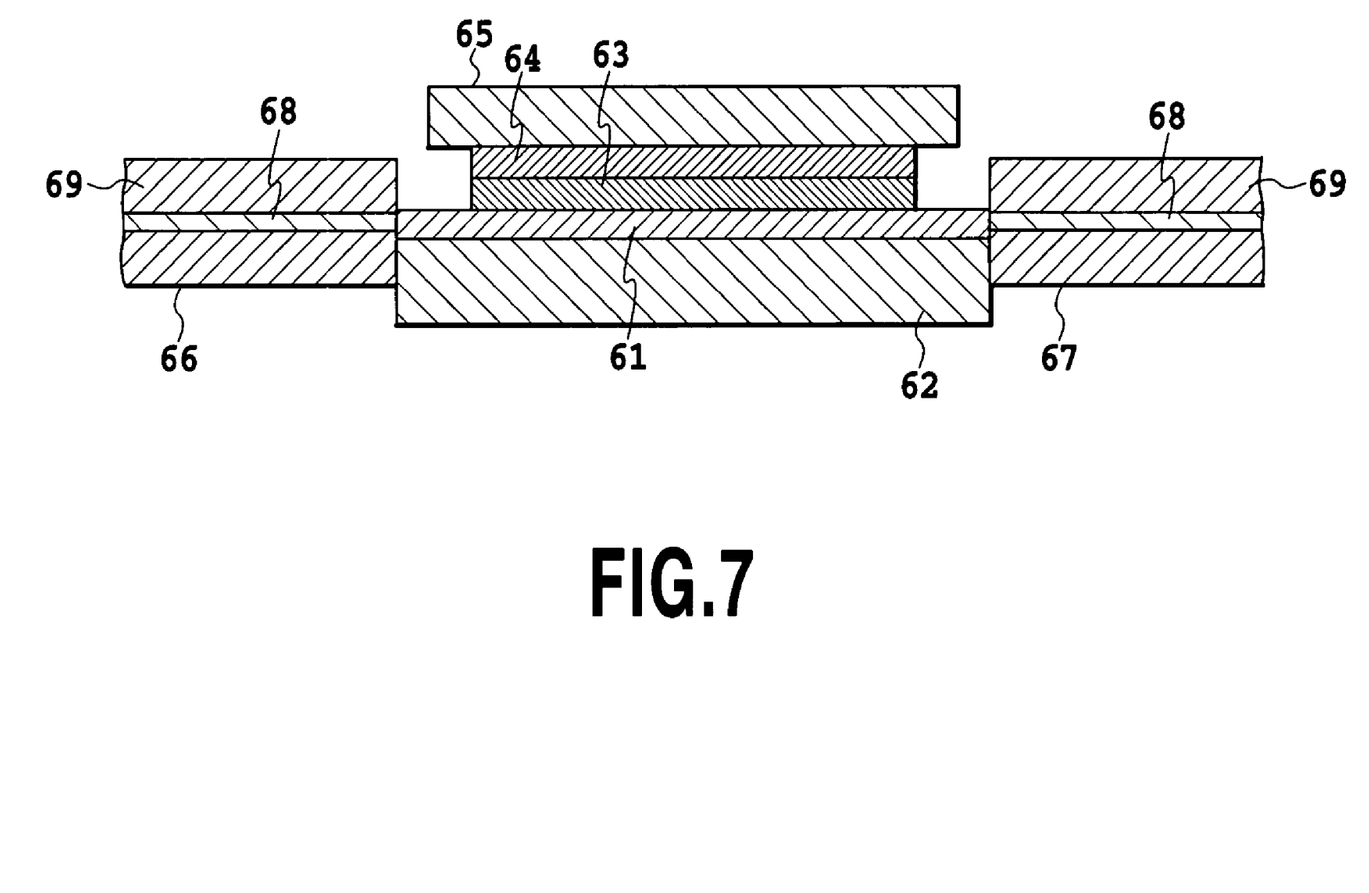
FIG. 7 is a sectional view showing a structure of a slit part of the optical waveguides, the insert plate, and their neighborhoods in the waveguide type optical device according to the one embodiment of the present invention.

FIG. 7 shows the slit part of the optical waveguide, the insert plate, and their neighborhoods in the waveguide type optical device according to the one embodiment of the present invention. Optical waveguides 61 are formed on a support substrate 62 for optical waveguides. On these optical waveguides 61, a MEMS supporting substrate 64 having an insert plate driving mechanism (MEMS) accommodation area 63 that is an area for accommodating the MEMS and a magnet 65 are arranged. The magnet 65 has dimensions and a shape such that an image thereof projected onto the optical waveguides 61 from a vertical direction falls in a surface of the optical waveguides 61. Preferably, the magnet 65 of a composition of a Nd—Fe—B system, as a row material, is used, but the magnet is not limited to this system.

Alignment of input-side and output-side fibers 66, 67 to the optical waveguides 61 in a vertical direction in a plane of the figure will be described. Each of the input-side and output-side fibers 66, 67 has a fiber core 68 and a fiber cladding layer 69. Then, the input-side fiber 66 of an optical signal and the output-side fiber 67 of the same are aligned so that centers of the fiber cores 68 thereof are adjusted precisely to the core ends of the optical waveguides 61 and cramped mechanically to complete the waveguide type optical device.

Figure 8:
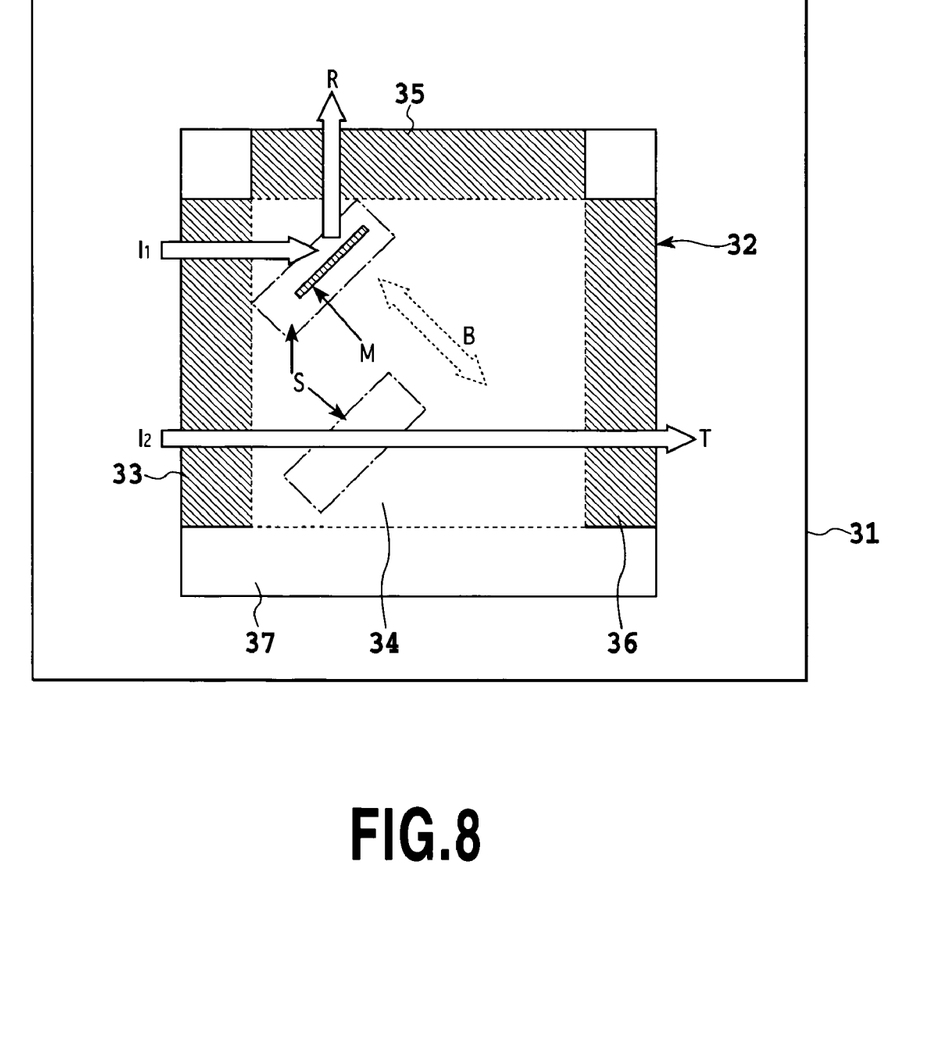
FIG. 8 is a plan view showing a structure of the optical waveguides of the waveguide type optical device according to the one embodiment of the present invention.

FIG. 8 shows a configuration of the optical waveguides of the waveguide type optical device according to the one embodiment of the present invention. The optical waveguides 32 are formed on a rectangular support base 31 for optical waveguides, and consists of five waveguide areas each of which plays a different role. Area 1 (33) is an area including a connection end face that allows the optical waveguides to be connected with optical fibers for inputting an arbitrary number of optical signals into the optical waveguides. Area 4 (36) is an area including a connection end face that allows the optical waveguide for outputting the optical signals being transmitted in the slit part S along a straight line after being inputted from Area 1 (33) to be connected with optical fibers. Area 3 (35) is an area including a connection end face that allows the optical waveguide for outputting the optical signals being reflected in the slit part S after being inputted from Area 1 (33) to be connected with optical fibers. Area 5 (37) is an area that does not include a connection end face for the optical waveguides and optical fibers.

Rectangular Area 2 (34) surrounded by the areas is provided with the slit parts S. In each slit part S, the insert plate M driven by the magnetic field is put into and out of it to control paths of signal light. Therefore, Area 2 (34) is given the static magnetic field B that induces a current in a current path on the cantilever when the insert plate M moves.

FIG. 8 exemplifies typical states of the optical waveguides in the input-side area 1 (33) using light beams I1, I2 that are input light. In the case of the light beam I1, since the insert plate M is in the slit part S, the input beam I1 is reflected by the insert plate M, and reflected light R belonging to Area 3 (35) of the reflected output side is outputted. On the other hand, in the case of the light beam I2, the insert plate M is not in the slit part S. Therefore, the light beam I2 is transmitted in the slit part S, traveling along a straight line, and is outputted in Area 4 (36) on the output side as transmitted light T.

The current induced by movement of the insert plate M has the highest efficiency when the direction of the static magnetic field B is at right angles to a plane parallel to a cross section viewed from the above as in FIG. 8 (or, a movement plane made by the insert plate in the slit of the insert plate and its neighborhood). Therefore, the magnet (not shown) is disposed so that the direction of the magnetic field B lies in a direction of the arrow shown by the dotted line in FIG. 8. Incidentally, the insert plate M is fixed firmly to the cantilever not shown in the figure; the insert plate M and the cantilever are driven as one body. For this driving, a bimetallic force, an electrostatic force, or the Lorentz' force each of which is produced by a driving mechanism not shown in the figure is used.

Figure 9:
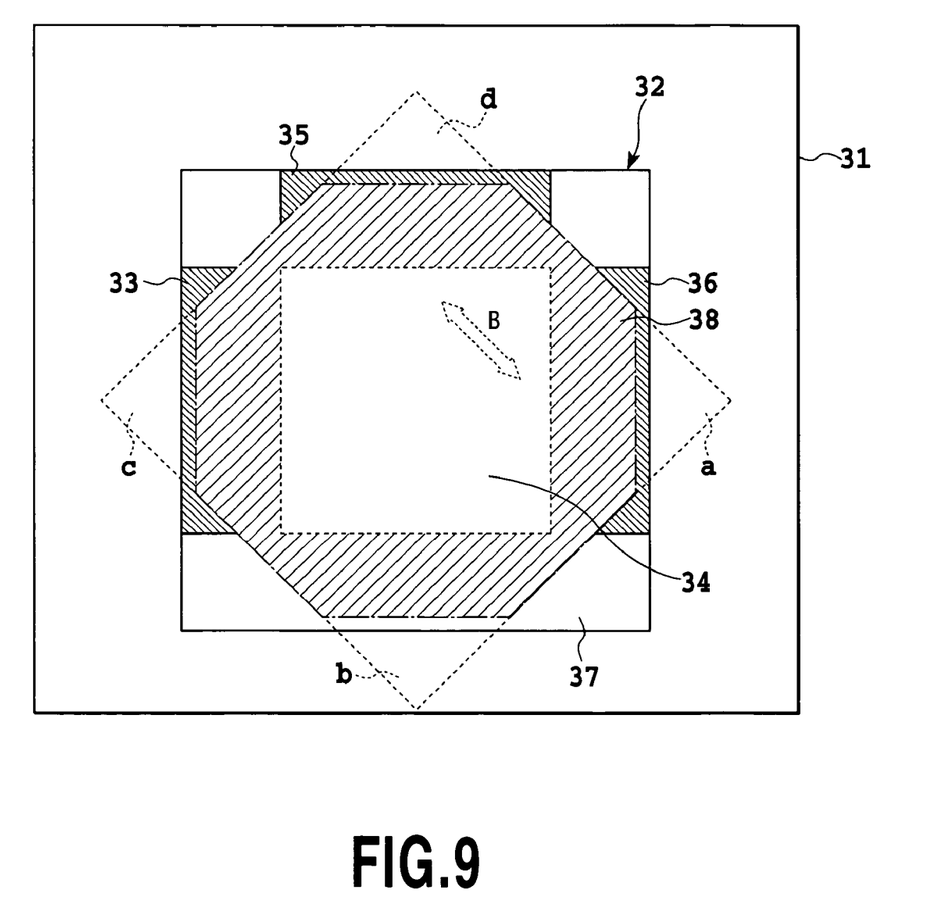
FIG. 9 is a plan view showing the shape of a magnet of the waveguide type optical device according to the one embodiment of the present invention.

FIG. 9 shows the shape of the magnet of the waveguide type optical device according to the one embodiment of the present invention. FIG. 9 is shown being overlapped with the optical waveguides shown in FIG. 8. The above-mentioned Area 1 (33), Area 4 (36), Area 3 (35), Area 5 (37), and Area 2 (34) surrounded by these areas need the static magnetic field for inducing a current in the current path on the cantilever when the insert plate M moves; therefore, a magnet 38 for generating this static magnetic field B is installed. The magnet 38 has an octagonal shape such that four corners (a, b, c, and d) of a rectangle are notched, and more specifically dimensions and the shape such that an image thereof projected onto the optical waveguides 32 from a vertical direction falls in an area of the optical waveguides 32. Thereby, the magnetic field strength of the whole area of Area 2 (34) becomes uniform and the area of the whole optical waveguides 32 can be reduced.

Figure 10:
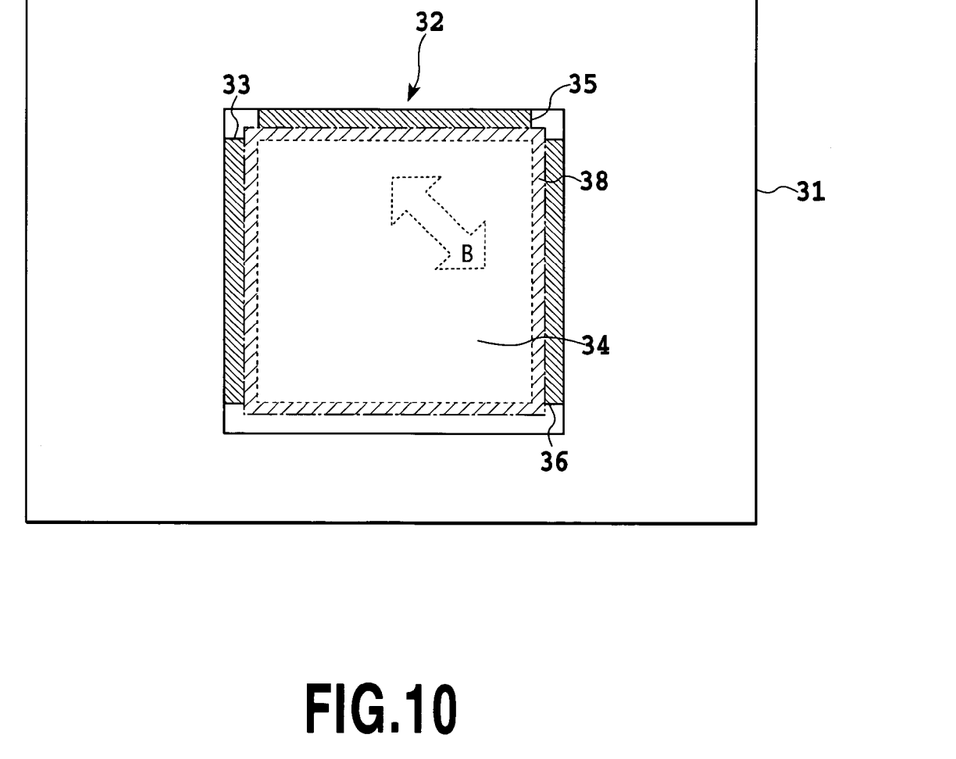
FIG. 10 is a plan view showing another embodiment of the magnet of the waveguide type optical device.

FIG. 10 shows another embodiment of the magnet of the waveguide type optical device. In this embodiment, the magnet 38 covering the whole are of Area 2 (34) is disposed. The magnet 38 is disposed so that a running direction of a straight line part of an outline thereof projected onto the optical waveguides from a vertical direction is not at right angles to the direction of the magnetic field generated by the magnet (in the case of this figure, a direction perpendicular to the insert plate). The shape of the magnet 38 is a minimum-area rectangle covering Area 2 (34). Manufacturing the magnet 38 in this shape can make the magnetic field strength of the whole of Area 2 (34) uniform, and can reduce the whole area of the optical waveguides 32 to a minimum necessary quantity. Note that although, in the example shown in FIG. 10, the shape of the magnet 38 is specified as a rectangle that is simplest and easy to manufacture, the magnet 38 is not limited to this shape but may be in any shape as long as a direction of the magnetic field is perpendicular to the insert plate and end faces of the magnet cover the slit parts. For example, it may be a rhombus etc.

As was explained in the foregoing, since the shape of the magnetic for applying the static magnetic field is optimized, a low-cost waveguide type optical device that realizes efficient arrangement of the optical waveguides and the reduced area of the optical waveguides chip can be provided.

As described above, according to the present invention, the waveguide type optical device capable of such monitoring as detection of a relative position of the insert plate to the groove, detection of movement abnormality of the insert plate, and detection of failure in the static position can be provided.

What is claimed is:

1. A waveguide type optical device including a first optical waveguide disposed on a substrate, a second optical waveguide that is disposed on the substrate and intersects the first optical waveguide, and a groove that is disposed at an intersection position of the first optical waveguide and the second optical waveguide and is for controlling optical paths of the optical waveguides, said waveguide type optical device comprising:

an insert plate disposed to be insertable into the groove;

means for applying a static magnetic field such that a vector product of a velocity vector of the insert plate and its magnetic field vector is nonzero;

a cantilever that has electrical wiring including therein a wiring part lying in a direction perpendicular to both the velocity vector and the magnetic field vector and that supports the insert plate; and means for detecting a relative position of the insert plate to the groove by detecting a current induced in the electrical wiring.

2. The waveguide type optical device according to claim 1, wherein the groove is filled with a liquid having the refractive index being matched to the refractive index of the optical waveguides.

3. The waveguide type optical device according to claim 1, wherein the insert plate has a reflecting surface and selects either an optical path from an input port of the first optical wave guide to an output port of the first optical wave guide or an optical path from the input port of the first optical waveguide to an output port of the second optical waveguide.

4. The waveguide type optical device according to claim 1, wherein an impressed current for giving the Lorentz' force to drive the cantilever is flowed in order to insert the insert plate into the groove.

5. The waveguide type optical device according to claim 1, wherein the means for applying the static magnetic field includes a sheet magnet having dimensions and a shape whose image projected onto the optical waveguide from a vertical direction can fall in a surface of the optical waveguides.

6. The waveguide type optical device according to claim 1, wherein the means for applying the static magnetic field includes a sheet magnet and said magnet is disposed so that a running direction of a straight line part of an outline projected onto the optical waveguides from a vertical direction is not at right angles to a direction of a magnetic field generated by the magnet.

7. A position detecting method for detecting a relative position of an insert plate that is disposed to be insertable to a groove used for controlling optical paths of optical waveguides arranged on a substrate with respect to the groove, said method comprising:
 applying a static magnetic field such that a vector product of a velocity vector of the insert plate and its magnetic field vector is nonzero;
 applying a driving force on a cantilever supporting the insert plate for a predetermined time, said insert pate has electrical wiring including therein a wiring part lying in a direction perpendicular to both the velocity vector and the magnetic field vector;
 detecting a current induced in the electrical wiring; and
 detecting a relative position of the insert plate to the groove.

* * * * *